United States Patent
Patenotre et al.

(10) Patent No.: US 6,739,242 B2
(45) Date of Patent: May 25, 2004

(54) MULTI-PURPOSE COOKING APPLIANCE OF THE AUTOMATICALLY-OPENING HINGED TYPE

(75) Inventors: Yves Patenotre, Designy (FR); Jean-Christophe Perrier, Aix les Bains (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 10/380,759

(22) PCT Filed: Sep. 10, 2001

(86) PCT No.: PCT/FR01/02802
§ 371 (c)(1),
(2), (4) Date: Aug. 18, 2003

(87) PCT Pub. No.: WO02/24043
PCT Pub. Date: Mar. 28, 2002

(65) Prior Publication Data
US 2004/0020371 A1 Feb. 5, 2004

(30) Foreign Application Priority Data
Sep. 19, 2000 (FR) .............................................. 00 11936

(51) Int. Cl.⁷ .......................... A47J 37/00; A47J 37/06; A47J 37/08; H05B 1/00; H05B 3/06
(52) U.S. Cl. .............................. 99/331; 99/342; 99/344; 99/349; 99/353; 99/372; 99/375; 219/521; 219/525
(58) Field of Search .................. 99/331–333, 342–344, 99/349, 425, 352, 353, 372–384, 400, 401, 444–450; 219/401, 400, 521–525, 537, 585, 586, 461, 45, 492, 494; 100/92, 305; 126/360, 20; 426/523, 520, 512

(56) References Cited
U.S. PATENT DOCUMENTS

| | | | |
|---|---|---|---|
| 2,936,697 A | | 5/1960 | Kueser |
| 3,799,047 A | | 3/1974 | Freeman |
| 3,880,084 A | * | 4/1975 | Martinez ..................... 99/349 |
| 4,913,040 A | | 4/1990 | Sherman et al. |
| 4,972,766 A | * | 11/1990 | Anetsberger ................. 99/332 |
| 5,473,976 A | * | 12/1995 | Hermansson ................. 99/349 |
| 5,531,155 A | * | 7/1996 | Pellicane et al. ............. 99/349 |
| 5,555,794 A | * | 9/1996 | Templeton et al. ........... 99/349 |
| 5,655,434 A | * | 8/1997 | Liebermann .................. 99/330 |
| 5,676,046 A | * | 10/1997 | Taber et al. .................. 99/340 |
| 5,755,150 A | * | 5/1998 | Matsumoto et al. .......... 99/334 |
| 5,771,782 A | * | 6/1998 | Taber et al. .................. 99/340 |
| 5,802,958 A | * | 9/1998 | Hermansson ................. 99/349 |
| 5,839,359 A | * | 11/1998 | Gardner ....................... 99/376 |
| 5,881,634 A | * | 3/1999 | Newton ........................ 99/349 |
| 5,890,419 A | * | 4/1999 | Moravec ...................... 99/349 |
| 6,044,755 A | | 4/2000 | Misceo |

FOREIGN PATENT DOCUMENTS

EP    0 787 453 A1    8/1997

* cited by examiner

Primary Examiner—Timothy F. Simone
(74) Attorney, Agent, or Firm—Young & Thompson

(57) ABSTRACT

An appliance comprising a housing consisting of two articulated shells maintained spaced apart by a spring (4) two hot plates (5,6) arranged in the housing, locking elements for maintaining the housing closed countering the spring, elements for adjusting (12) cooking parameters, and elements for controlling the locking elements to urge them in unlocked position in accordance with cooking parameters, thereby controlling the opening of the housing under the effect of the spring (4). The locking elements include a locking component linked to one of the shells (1) so as to be mobile between an unlocked position wherein it co-operates with a locking finger (24) integral with the other shell (2), a spring for urging back the locking component in unlocked position, and a relay magnet (25) controlled by the control elements, for maintaining the locking component in locked position.

20 Claims, 3 Drawing Sheets

MULTI-PURPOSE COOKING APPLIANCE OF THE AUTOMATICALLY-OPENING HINGED TYPE

The present invention relates to a cooking appliance of the type comprising two electric cooking plates or "hot plates" disposed face to face and connected together via a hinge.

It is applicable particularly, but not exclusively, to cooking appliances of the waffle-iron or steak-grill type made up of two hot plates which are mounted to pivot relative to each other, and between which the food to be cooked is placed.

Currently, appliances of that type require manual action to move the plates apart in order to place food between them or remove food from between them, or in order to inspect the progress of the cooking. That solution is impractical for various reasons. The manual handling necessary to open and close the appliance is inconvenient. Risks of suffering burns ensue. Cooking time is left to the appreciation of the user. There is therefore no repeatability in the cooking quality obtained.

In addition, in most currently available appliances, the cooking temperature is regulated by an electromechanical thermostat (which can be fixed or adjustable) which offers accuracy to within no better than 50° C. for the hot plate temperature, which does not make it possible to obtain uniform cooking results.

Patent Document GB 621 155 discloses an electrical cooking appliance having a lid, a thermostat making it possible to adjust the temperature, and a clockwork mechanism which makes it possible to define a cooking time, and which causes the lid to open and stops the heating when the cooking time has elapsed.

Patent Document U.S. Pat. No. 2,936,697 describes another electrical cooking appliance closed by a lid, the lid in that appliance being opened automatically and heating being stopped automatically at the end of the cooking cycle, those operations being triggered by expansion of a bimetallic strip subjected to the cooking temperature.

Such appliances use opening mechanisms that are complex and therefore costly, and cooking temperature regulation means that suffer from the above-mentioned drawbacks.

An object of the present invention is to eliminate those drawbacks. To this end, the present invention provides a cooking appliance of the type comprising:

- a housing made up of a bottom shell and of a top shell fixed together via a hinge, and held spaced apart by first resilient return means;
- at least one hot plate disposed inside the housing;
- locking means for holding the housing closed against the drive from the return means;
- setting means for setting cooking parameters; and
- control means for controlling the locking means so as to put them into the unlocked position as a function of the cooking parameters, thereby causing the housing to open under drive from the return means.

In the invention, said cooking appliance is characterized in that the locking means comprise:

- a locking piece associated with one of the shells so as to be movable between an unlocked position and a locked position in which it co-operates with a locking finger secured to or integral with the other shell to hold the housing in the closed position;
- second resilient return means for returning the locking piece into the unlocked position; and
- an electromagnet controlled by the control means so as to hold the locking piece in the locked position.

By using a single moving locking piece and an electromagnet, the invention thus enables such cooking appliances to be made much more simply, without requiring heavy and voluminous control means.

The appliance may have two hot plates which are mounted in respective ones of the two shells of the housing, and between which the food to be cooked is disposed.

Advantageously, the appliance of the invention further comprises a processor connected to the setting means for setting the cooking parameters, and designed to control the electromagnet as a function of the cooking parameters.

In a feature of the invention, the appliance is provided with an electrical contact actuated by the housing opening, and connected to the processor to enable it to detect the position of the housing, i.e. whether it is open or closed.

In another feature of the invention, the hot plates are coupled to electrical heater elements, the appliance further being provided with a relay controlled by the processor to control delivery of electrical power to the elements.

In yet another feature of the invention, the hot plates are associated with a temperature sensor connected to the processor which is provided with means for controlling delivery of power to the electrical heater elements of the hot plates so as to maintain them at a setpoint temperature, the setting means being designed to define a setpoint temperature for the cooking cycle.

An embodiment of the cooking appliance of the invention is described below by way of non-limiting example and with reference to the accompanying drawings, in which.

Figure 1:
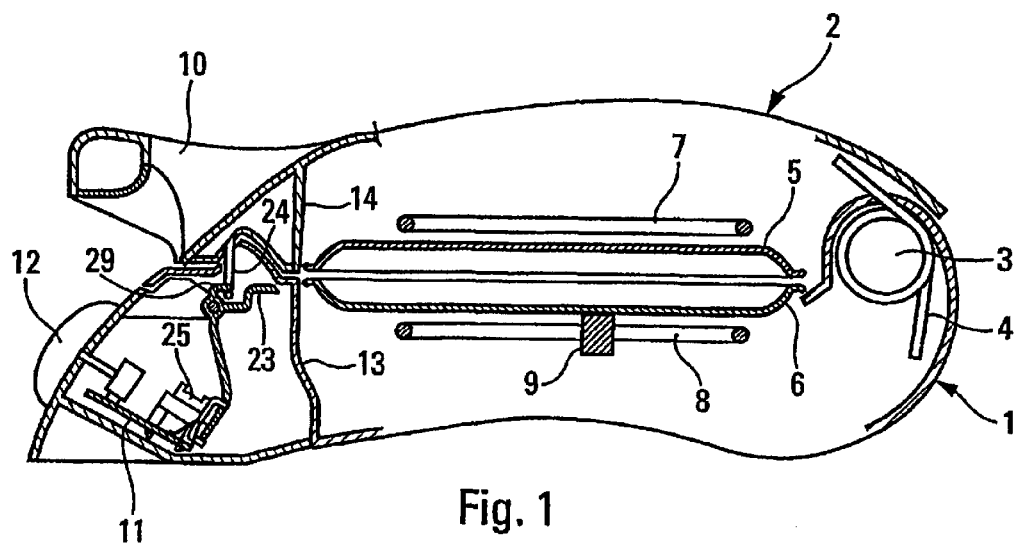
FIG. 1 is a longitudinal section view of a cooking appliance of the invention.

FIG. 1 shows a cooking appliance of the type comprising two hot plates 5, 6 disposed facing each other in a housing made up of a bottom shell 1 and of a top shell 2 that forms a lid and that is connected to the bottom shell 1 via a hinge 3. The two shells are urged into a position in which they are spaced apart from each other by resilient means 4 such as a helical torsion spring incorporated into the hinge 3 and ensuring that the appliance opens widely when it is in the open position. The top shell is provided with a handle 10 situated opposite from the hinge 3 and enabling the user of the appliance to hold it so as to close said top shell onto the bottom shell 1. The hot plates 5, 6 are associated with respective electric heater means 7, 8 such as electrical heater elements, disposed respectively above the top hot plate, situated in the top shell, and below the bottom hot plate 6, situated in the bottom shell.

At least one of the two elements 7, 8, e.g. the bottom element 8, may be associated with a regulation member 9 for regulating the temperature of the elements to the vicinity of a certain setpoint temperature.

In the invention, the cooking appliance further comprises a mechanism for locking the top shell 2 onto the bottom shell 1, which mechanism is actuated by a control device 11 which may be set by a programming knob 12.

Each of the shells 1, 2 is provided with a partition 13, 14 that is perpendicular to the plane of the openings in the shells and parallel to the axis of the hinge 3, and that subdivides its internal volume into two compartments, namely a cooking compartment enclosing the hot plates and the elements, and a control and locking compartment enclosing the locking mechanism and the locking and control device 11 for locking the top shell 2 onto the bottom shell 1.

The control and locking compartment of the bottom shell 1 is provided with a top window disposed facing a locking finger 24 that is secured to or integral with the top shell 2, that passes through the plane of the opening of the housing, and that engages in said window to lock the top shell onto the bottom shell.

Figure 2:
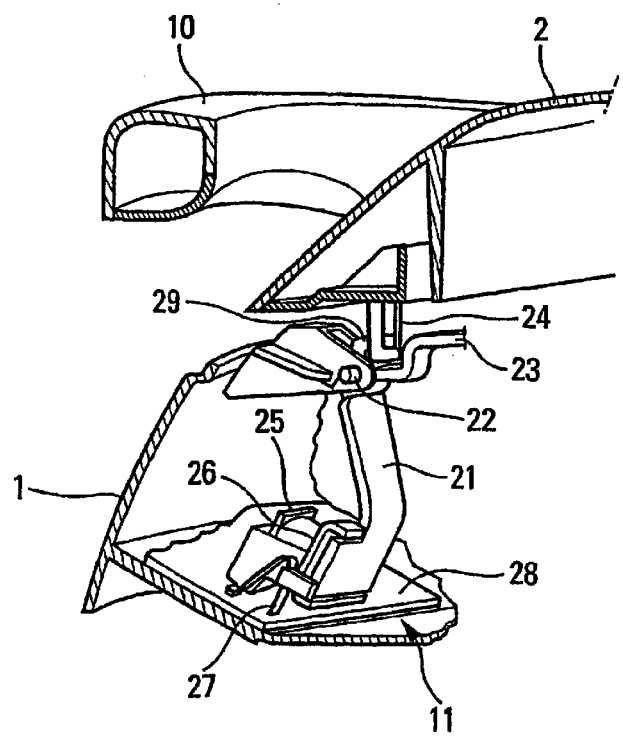
FIG. 2 is a fragmentary perspective view of the locking system for locking the lid of the appliance shown in FIG. 1.
Figure 3:
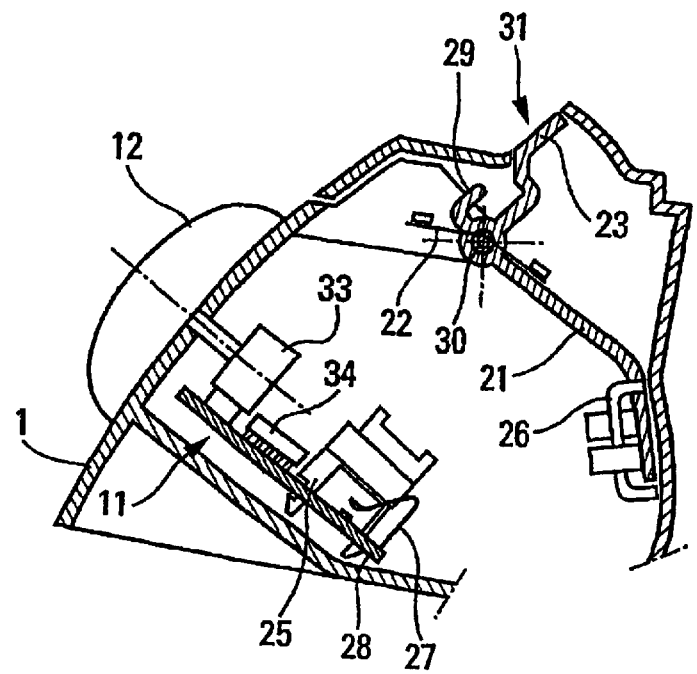
FIGS. 3 and 4 are detailed fragmentary views in longitudinal section of the appliance shown in FIG. 1, with the appliance being shown closed in FIG. 2 and open in FIG. 3.
Figure 4:
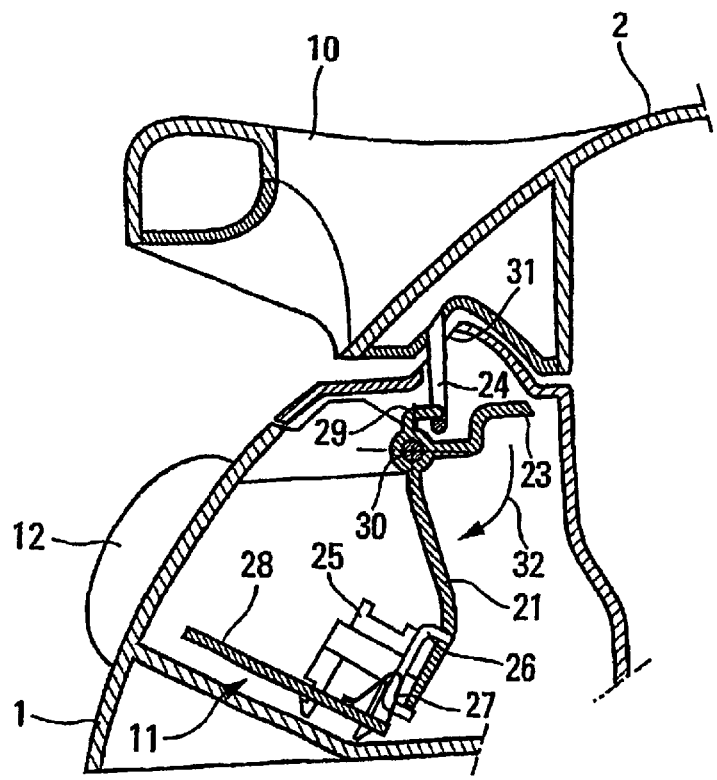

As shown in FIGS. 2 to 4, in the bottom shell 1, the locking mechanism comprises a locking piece mounted to pivot about an axis 30 parallel to the plane of the opening of the housing. The locking piece is made up of three branches interconnected at its pivot axis and extending in a plane perpendicular to said axis, namely a first branch forming a catch 29, a second branch forming a lever arm 21 whose bottom end supports a plate 26 disposed to co-operate with an electromagnet 25, and a third branch supporting a closure flap 23 for closing the window 31 disposed in the bottom shell 1 and through which the locking finger 24 is inserted. The locking piece is returned by a spring 22 to its unlocked position shown in FIG. 3. In this position, the flap 23 closes the window 31, thereby preventing foreign bodies from penetrating into the control and locking compartment.

The lever arm 21 advantageously has a length that is relatively long compared with the other branches of the locking piece, thereby making it possible to reduce the force necessary to hold the locking piece in the locked position. The electromagnet 25 can thus be of small size and can be controlled by low current.

The locking finger 24 is U-shaped so that, when the two shells 1, 2 are in the locked-together position, the catch 29 can engage in the U-shape to retain the top shell 2 against the bottom shell against the drive from the spring 4.

The electromagnet 25 is mounted on a printed circuit board 28 on which electronic components are mounted, in particular a potentiometer 33 actuated by the control knob 12, and a processor, such as a microcontroller 34 (FIG. 3).

When food is to be cooked, the cooking time or a pre-programmed function is selected by means of the knob 12, thereby turning the potentiometer 33 connected to the micro-controller 34. The food is then placed on the bottom hot plate 5, and then the top shell 2 is pivoted about the axis of the hinge 3 against the drive from the spring 4 so as to close the appliance. During this pivoting movement, the locking finger 24 penetrates into the window 31 by pushing back the flap 23, thereby causing the locking piece to pivot against the drive from the spring 22, and thus placing the plate 26 fixed to the end of the arm 21 in the vicinity of the electromagnet 25. If the electromagnet controlled by the micro-controller 34 is switched on, the plate 26 comes to adhere to the electromagnet, thereby locking the catch 29 in the locking finger 24. During the end of the stroke of the locking piece, the arm 21 presses on a resilient contact blade 27 disposed on the printed circuit board 28 and which closes an electrical contact 45 connected to the micro-controller 34. In this way, the microcontroller 34 is informed that the appliance is closed, and then starts the cooking cycle.

At the end of the cooking cycle managed by the micro-controller 34, the microcontroller switches off the electro-magnet 25, thereby releasing the locking piece which is returned by the spring 22 to its unlocked position, and causing the appliance to open under drive from the spring 4.

Figure 6:
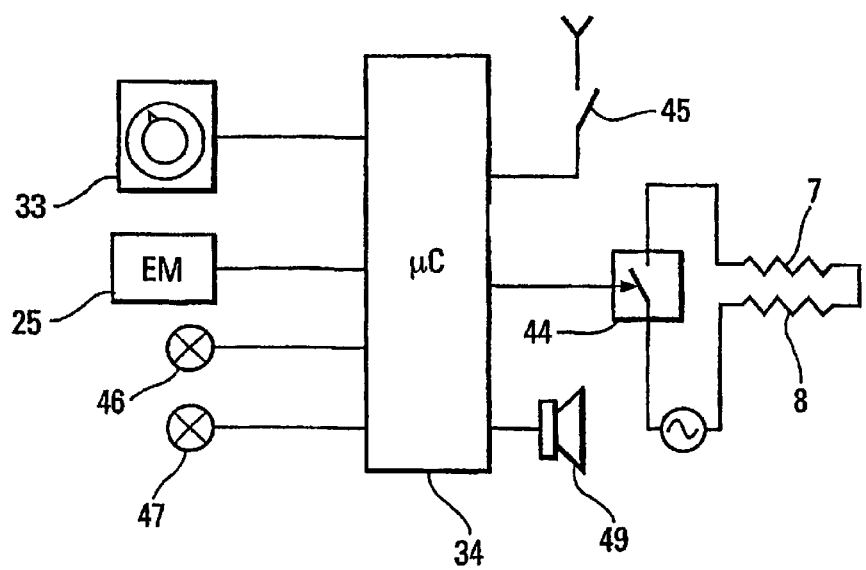
FIG. 6 is a diagram showing an electrical circuit for controlling the appliance.

As shown in FIG. 6, the microcontroller 34 may also manage indicator lights 46, 47 such as light-emitting diodes (LEDs) which are lit if the appliance is switched on, and undergoing a cooking cycle, and a sound-emitting device 49 which can be triggered at the end of the cooking cycle when the appliance opens.

The regulation member 9 may be electro-mechanical and may consist of a thermostat. In a preferred variant embodiment of the invention, said regulation member 9 comprises a temperature sensor placed in contact with the hot plates 5, 6 and connected to the micro-controller 34. For example, the sensor is of the resistive type whose resistance varies as a function of its temperature.

During the cooking cycle of the appliance, the temperature of the hot plates 5, 6 is regulated by the micro-controller 34 on the basis of a setpoint temperature which is entered by the user by means of the knob 12, the regulation being performed by means of a relay 44 (FIG. 6) which controls switching on of the elements 7, 8.

For this purpose, the micro-controller 34 receives temperature values from the sensor at regular intervals and on the basis of which it evaluates a derivative value, i.e. the speed at which the hot plate temperature is changing. The temperature values are stored in a temporary stack, e.g. containing the 10 most recent values, on the basis of which the derivative is calculated.

Throughout the cooking cycle, the micro-controller 34 evaluates a condition for interrupting power to the heater elements 7, 8, by means of an appropriate mathematical formula applied to the current temperature values as measured by the sensor, and by means of the moving temperature derivative as calculated.

The mathematical formula is chosen so as to prevent the temperature of the hot plates from overshooting the setpoint temperature.

Figure 5:
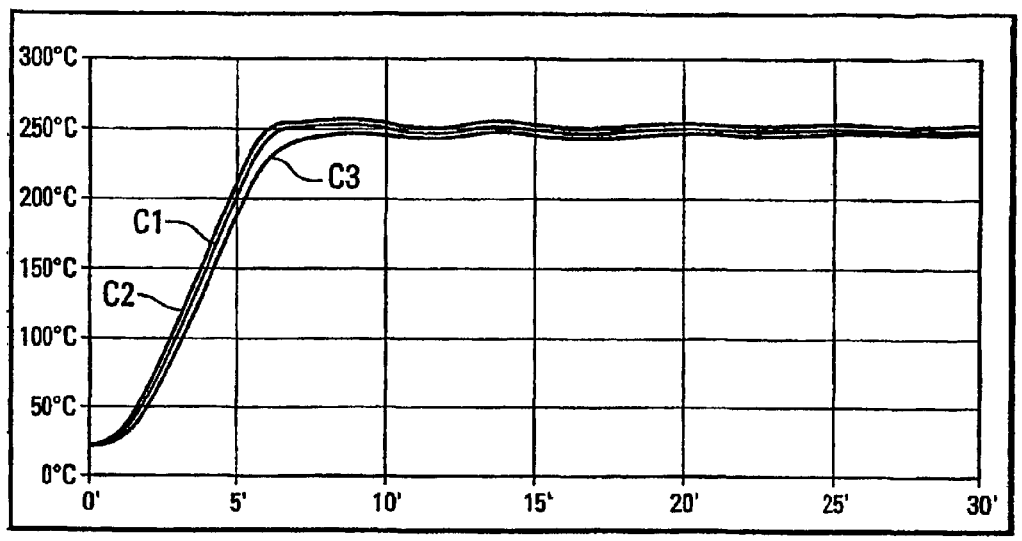
FIG. 5 shows curves giving temperature over time, illustrating how the appliance of the invention operates.

FIG. 5 shows the curves C1, C2, C3 indicating how the temperature of the hot plates 5, 6 and the temperature as measured by the sensor vary over time.

In FIG. 5, the cooking cycle starts with a first stage during which the temperature of the hot plates 5, 6 rises, and during which the temperature derivative is substantially constant. At the end of the first stage, the temperature as measured by the sensor is close to the setpoint temperature (about 250° C.) and the microcontroller considers that the condition for interrupting power to the elements 7, 8 has been reached. It therefore causes the interrupter relay 44 to open.

After the power to the elements has been interrupted for a few seconds, corresponding to the second stage of the cooking cycle, the micro-controller detects that the temperature derivative is changing (sagging of the curves C1, C2, C3), and it switches the electrical heater elements back on until the condition for interrupting power to the elements is reached once again. During a third stage in which the temperature is maintained, the curves C1, C2, C3 remain substantially at the setpoint temperature and the derivative is zero.

This configuration makes it possible firstly to avoid overshooting the setpoint temperature by several tens of degrees, which inevitably occurs when electromechanical members are used, and secondly to maintain the temperature of the hot plates substantially equal to the setpoint temperature, which may be set with much greater accuracy, of about 5° C. The appliance of the invention can thus be used to cook various types of food that have different optimum cooking temperatures.

In addition, if the hot plates are hot at the time at which the food to be cooked is put into the appliance, they then cool suddenly because the food is cold. The micro-controller 34 can thus detect this time by means of the calculated derivative, and can thus accurately determine the start of the cooking cycle.

Advantageously, the micro-controller determines the cooking time, given that the lower the hot plate temperature when the food is put in the appliance, the longer the cooking time must be.

In a feature of the invention, when the appliance opens at the end of cooking, the micro-controller goes into a "keep food hot" mode for keeping the food hot on the hot plate, and in which it servo-controls the hot plate temperature to a setpoint temperature of a few tens of degrees, which temperature is sufficient to keep the food that has just been cooked hot, but is lower than a minimum cooking temperature. Naturally, when the appliance is closed again, the micro-controller takes account once more of the setpoint temperature entered by the user by means of the knob 12.

It is possible to provide separate means for entering the cooking setpoint temperature and for entering the cooking time. Alternatively, the knob 12 makes it possible to enter the type of food placed in the appliance, the micro-controller then having access to a table giving the optimum cooking temperature and cooking time as a function of the food type entered.

What is claimed is:

1. A cooking appliance of the type comprising:
   a housing made up of a bottom shell (1) and of a top shell (2) fixed together via a hinge (3), and held spaced apart by first resilient return means (4);
   at least one hot plate (5, 6) disposed inside the housing;
   locking means for holding the housing closed against the drive from the return means;
   setting means (12) for setting cooking parameters; and
   control means for controlling the locking means so as to put them into an unlocked position as a function of the cooking parameters, thereby causing the housing to open under drive from the return means (4);
   said cooking appliance being characterized in that the locking means comprise:
   a locking piece associated with one of the shells (1) so as to be movable between an unlocked position and a locked position in which it co-operates with a locking finger (24) secured to or integral with the other shell (2) to hold the housing in the closed position;
   second resilient return means (22) for returning the locking piece into the unlocked position; and
   an electromagnet (25) controlled by the control means so as to hold the locking piece in the locked position.

2. A cooking appliance according to claim 1, characterized in that it has two hot plates (7, 8) which are mounted in respective ones of the two shells (1, 2) of the housing.

3. A cooking appliance according to claim 1, characterized in that the locking piece is mounted to pivot about an axis (30) parallel to the plane of the opening in the bottom shell (1), and it comprises three branches connected together at its pivot axis and extending in a plane perpendicular to said axis, namely a first branch forming a catch (29) co-operating with the locking finger (24), a second branch forming a lever arm (21) whose bottom end supports a plate (26) disposed to co-operate with the electromagnet (25), and a third branch supporting a closure flap (23) for closing a window (31) through which the locking finger (24) is inserted.

4. A cooking appliance according to claim 1, characterized in that the control means for controlling the locking means comprise a processor (34) connected to the setting means (12) for setting the cooking parameters, and designed to control the electromagnet (25) as a function of the cooking parameters.

5. A cooking appliance according to claim 4, characterized in that it is provided with an electrical contact (45) actuated by the housing opening, and connected to the processor (34) for detecting the open and closed positions of the housing.

6. A cooking appliance according to claim 3, characterized in that the hot plates (5, 6) are coupled to electrical heater elements (7, 8), the appliance further being provided with a relay (44) controlled by the processor (34) to control delivery of electrical power to the elements.

7. A cooking appliance according to claim 3, characterized in that the hot plates are associated with a temperature sensor (9) connected to the processor (34) which is provided with means for controlling delivery of power to the electrical heater elements (7, 8) of the hot plates (5, 6) so as to maintain them at a setpoint temperature, the setting means (12) being designed to define a setpoint temperature for the cooking cycle.

8. A cooking appliance according to claim 7, characterized in that the processor (34) has means for triggering a "keep hot" mode at the end of the cooking cycle, means for establishing the hot plate setpoint temperature at a value just sufficient to keep the food on the hot plate (5, 6) hot in the "keep hot" mode.

9. A cooking appliance according to claim 7, characterized in that the processor (34) has means for calculating the value of the moving derivative of the temperature delivered by the sensor, and means for evaluating a condition for interrupting the power to the electrical heater elements (7, 8) as a function of current values of the temperature delivered by the sensor and of the moving derivative.

10. A cooking appliance according to claim 7, characterized in that it further comprises means for defining the type of food disposed on the hot plates, the processor (34) having means fox determining the cooking parameters as a function of the type of food thus defined.

11. A cooking appliance according to claim 7, characterized in that the processor (34) has means for detecting a reduction in temperature resulting from the food to be cooked being put on the hot plate (5, 6), and means for triggering a cooking cycle as soon as such a reduction in temperature is detected.

12. A cooking appliance according to claim 2, characterized in that the locking piece is mounted to pivot about an axis (30) parallel to the plane of the opening in the bottom shell (1), and it comprises three branches connected together at its pivot axis and extending in a plane perpendicular to said axis, namely a first branch forming a catch (29) co-operating with the locking finger (24), a second branch forming a lever arm (21) whose bottom end supports a plate (26) disposed to co-operate with the electromagnet (25), and a third branch supporting a closure flap (23) for closing a window (31) through which the locking finger (24) is inserted.

13. A cooking appliance according to claim 2, characterized in that the control means for controlling the locking means comprise a processor (34) connected to the setting means (12) for setting the cooking parameters, and designed to control the electromagnet (25) as a function of the cooking parameters.

14. A cooking appliance according to claim 3, characterized in that the control means for controlling the locking means comprise a processor (34) connected to the setting means (12) for setting the cooking parameters, and designed to control the electromagnet (25) as a function of the cooking parameters.

15. A cooking appliance according to claim 3, characterized in that the hot plates (5, 6) are coupled to electrical heater elements (7, 8), the appliance further being provided with a relay (44) controlled by the processor (34) to control delivery of electrical power to the elements.

16. A cooking appliance according to claim 8, characterized in that the processor (34) has means for calculating the value of the moving derivative of the temperature delivered by the sensor, and means for evaluating a condition for interrupting the power to the electrical heater elements (7, 8) as a function of current values of the temperature delivered by the sensor and of the moving derivative.

17. A cooking appliance according to claim 8, characterized in that the processor (34) has means for calculating the value of the moving derivative of the temperature delivered by the sensor, and means for evaluating a condition for interrupting the power to the electrical heater elements (7, 8) as a function of current values of the temperature delivered by the sensor and of the moving derivative.

18. A cooking appliance according to claim 9, characterized in that the processor (34) has means for calculating the value of the moving derivative of the temperature delivered by the sensor, and means for evaluating a condition for interrupting the power to the electrical heater elements (7, 8) as a function of current values of the temperature delivered by the sensor and of the moving derivative.

19. A cooking appliance according to claim 8, characterized in that the processor (34) has means for detecting a reduction in temperature resulting from the food to be cooked being put on the hot plate (5, 6), and means for triggering a cooking cycle as soon as such a reduction in temperature is detected.

20. A cooking appliance according to claim 9, characterized in that the processor (34) has means for detecting a reduction in temperature resulting from the food to be cooked being put on the hot plate (5, 6), and means for triggering a cooking cycle as soon as such a reduction in temperature is detected.

* * * * *